United States Patent [19]

Franz et al.

[11] 4,332,861

[45] Jun. 1, 1982

[54] PLASTIC SURFACE TREATMENT

[75] Inventors: Helmut Franz; James H. Hanlon, both of Pittsburgh; Lloyd G. Shick, Natrona Heights, all of Pa.

[73] Assignee: PPG Industries, Inc., Pittsburgh, Pa.

[21] Appl. No.: 209,637

[22] Filed: Nov. 24, 1980

[51] Int. Cl.³ .................... B05D 3/12; B32B 27/30; C08J 7/04
[52] U.S. Cl. .................... 428/520; 427/140; 427/161; 427/164; 427/290
[58] Field of Search .............. 427/161, 140, 164, 290; 428/520

[56] References Cited

U.S. PATENT DOCUMENTS 3,485,662  12/1969  Metevia et al. .................... 427/140

OTHER PUBLICATIONS

Encyclopedia of Polymer Science and Technology, vol. 1, pp. 297–300, Interscience Publishers, New York.

Primary Examiner—James R. Hoffman
Attorney, Agent, or Firm—Donna L. Seidel

[57] ABSTRACT

A method is disclosed for improving a roughened surface of a plastic article by applying a smooth, durable polymer coating.

10 Claims, No Drawings

PLASTIC SURFACE TREATMENT

FIELD OF THE INVENTION

This invention relates generally to the art of transparent plastics and particularly to the art of treating rough surfaces of transparent plastic articles.

THE PRIOR ART

It has been observed in the art of plastic transparencies that as a result of processing, such as cutting, grinding, routing, drilling, and so on, the machined edges of the plastic have a rough texture. This rough surface, in addition to having an objectionable translucent appearance, appears to weaken the article. Scratches, cracks, microcracks and other machining tool marks provide starting points for crazing and cracking under stress.

SUMMARY OF THE INVENTION

The present invention provides a method for improving the optical quality and mechanical strength of plastic transparencies by coating rough surfaces with a clear polymer finish. The polymer provides a smooth, transparent, durable surface that withstands temperature changes, atmospheric conditions, moisture penetration, radiation, and stress bending or deformation.

DETAILED DESCRIPTION OF THE PREFERRED EMBODIMENT

Plastic transparencies, particularly acrylic transparencies for aircraft windows, undergo various machining processes such as cutting, drilling, routing and so on, as well as physical handling which may produce scratches, in the course of their fabrication. As a result of such processing, portions of the surface of the plastic become roughened and exhibit a decrease in transparency. In addition to detracting from the optical quality, particularly of a transparent article, the roughened surface portion also appears to affect the durability of the article. Roughened surfaces typically cause the plastic to have a transparency of less than 70 percent and to exhibit a hazy, translucent appearance. Chips, microcracks and other machining tool marks appear to provide weak points for the initiation of crazing in the presence of moisture or solvents or cracking under stress. For example, when holes are drilled through an acrylic transparency, cracks appear to be propagated in the plane of the acrylic sheet more readily from the machined portion than from an unprocessed surface.

The present invention provides a method for improving the optical quality, strength and durability of roughened surfaces of a plastic transparency by coating the roughened surfaces with a clear, high gloss polymer, preferably a fast curing acrylic, polyurethane or epoxy resin.

In a preferred embodiment, the roughened surface of an acrylic transparency is coated with an ethyl acrylate composition. Acrylic compositions which may be treated in accordance with the present invention include both modified and unmodified polymerization products of acrylic acid. Preferred acrylic compositions include modified polymerization products of methyl methacrylate, available as plexiglas ® acrylic stock from Rohm and Haas, Philadelphia, Pa. A solution of the ethyl acrylate composition may be applied by spraying, brushing, or any convenient technique. A preferred ethyl acrylate composition is a toluene based solution of polyethylmethacrylate which cures rapidly at room temperature to give a smooth, durable, non-tacky, high gloss, transparent finish to the roughened surface. Typically, the coated surface will restore to the article a transparency in excess of 80 percent.

The present invention will be further understood from the descriptions of specific examples which follow.

EXAMPLE I

A transparent acrylic substrate 12 millimeters thick has a luminous transmittance of 91 percent and a luminous reflectance of 4.5 percent. The substrate is machined to form a routed edge 4 millimeters deep extending 15 millimeters in from the perimeter. The rough, machined surface portion of the acrylic transparency has a luminous transmittance of 59 percent and a luminous reflectance of 3.0 percent. The routed edge is treated by spraying on a toluene based ethyl acrylate composition available from Stan Chem. Inc. of East Berlin, Connecticut under the tradename INCRALAC. The solvent evaporates quickly and the ethyl acrylate cures at room temperature to form a smooth, transparent, high gloss finish. The coated routed edge of the acrylic substrate has a luminous transmittance of 91 percent and a luminous reflectance of 4.6 percent.

EXAMPLE II

Samples treated according to Example I are subjected to 210° F. (99° C.) temperatures for 3 hours and −8° F. (−22° C.) temperatures for 72 hours with no crazing, cracking, peeling or discoloration, thereby providing evidence of their durability.

EXAMPLE III

Flat samples treated according to Example I are bent to a 45° angle at 200° F. (93° C.). These samples are also subjected to the temperature extremes of Example II and likewise exhibit no crazing, cracking, peeling or discoloration, thereby providing evidence of their durability even under stress.

The above examples are offered to illustrate the present invention. Other polymeric compositions such as urethanes and epoxy resins may be used for treating rough surfaces of acrylic and other polymeric substrates. The scope of the present invention is defined by the following claims.

We claim:

1. A method for treating plastic articles comprising the steps of:
   a. processing a plastic article whereby a rough surface is produced; and
   b. coating the rough surface with a clear polymer selected from the group consisting of acrylics, polyurethanes and epoxy resins to provide a smooth, durable transparent finish.

2. The method according to claim 1, wherein the polymer is selected from the group consisting of acrylics and polyurethanes.

3. The method according to claim 2, wherein the polymer coating is formed from ethyl acrylate.

4. The method according to claim 3, wherein the plastic article comprises an acrylic transparency.

5. The method according to claim 4, wherein the acrylic transparency comprises polymethylmethacrylate.

6. A method for treating a rough surface of a plastic transparency to provide a smooth, durable, transparent finish comprising the steps of:
   a. applying to the rough surface a solution of a composition capable of curing to form a clear, high gloss polymer film selected from the group consisting of acrylics, polyurethanes and epoxy resins;
   b. evaporating the solvent; and
   c. curing the composition to form a clear, high gloss polymer finish.

7. The method according to claim 6, wherein the polymer is selected from the group consisting of acrylics and polyurethanes.

8. The method according to claim 7, wherein the polymer is formed from ethyl acrylate.

9. The method according to claim 8, wherein the rough surface of an acrylic transparency is treated by applying a toluene solution of ethyl acrylate which cures at ambient temperatures to provide a smooth, durable, transparent finish.

10. An article prepared according to the method of claim 9, wherein the acrylic is poly(methyl methacrylate).

* * * * *